United States Patent
Kim et al.

(10) Patent No.: US 11,017,673 B2
(45) Date of Patent: May 25, 2021

(54) METHOD AND DEVICE FOR LEARNING GENERATING LANE DEPARTURE WARNING (LDW) ALARM BY REFERRING TO INFORMATION ON DRIVING SITUATION TO BE USED FOR ADAS, V2X OR DRIVER SAFETY REQUIRED TO SATISFY LEVEL 4 AND LEVEL 5 OF AUTONOMOUS VEHICLES

(71) Applicant: Stradvision, Inc., Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision. Inc., Gyeongsangbuk-do (KR)

( * ) Notice: Subject to any disclaimer, the term of this patent is extended or adjusted under 35 U.S.C. 154(b) by 0 days.

(21) Appl. No.: 16/727,041

(22) Filed: Dec. 26, 2019

(65) Prior Publication Data
US 2020/0250986 A1    Aug. 6, 2020

Related U.S. Application Data

(62) Division of application No. 16/263,220, filed on Jan. 31, 2019, now Pat. No. 10,553,118.

(51) Int. Cl.
*B60W 30/18*    (2012.01)
*G08G 1/16*    (2006.01)
(Continued)

(52) U.S. Cl.
CPC ............. *G08G 1/167* (2013.01); *B60Q 9/008* (2013.01); *B60R 1/006* (2013.01); *B60R 11/04* (2013.01);
(Continued)

(58) Field of Classification Search
None
See application file for complete search history.

(56) References Cited

U.S. PATENT DOCUMENTS 10,207,640 B2    2/2019    Bachorski
2010/0295707 A1    11/2010    Bennie et al.
(Continued)

FOREIGN PATENT DOCUMENTS

EP    3040809 A1    7/2016
WO    2016209423 A1    12/2016

*Primary Examiner* — Brent Swarthout
(74) *Attorney, Agent, or Firm* — Huscb Blackwell LLP

(57) ABSTRACT

A method for generating a lane departure warning (LDW) alarm by referring to information on a driving situation is provided to be used for ADAS, V2X or driver safety which are required to satisfy level 4 and level 5 of autonomous vehicles. The method includes steps of: a computing device instructing a LDW system (i) to collect information on the driving situation including information on whether a specific spot corresponding to a side mirror on a side of a lane, into which the driver desires to change, belongs to a virtual viewing frustum of the driver and (ii) to generate risk information on lane change by referring to the information on the driving situation; and instructing the LDW system to generate the LDW alarm by referring to the risk information.
(Continued)

Thus, the LDW alarm can be provided to neighboring autonomous vehicles of level 4 and level 5.

20 Claims, 8 Drawing Sheets

(51) Int. Cl.
  *G06K 9/00* (2006.01)
  *B60Q 9/00* (2006.01)
  *B60R 1/00* (2006.01)
  *B60R 11/04* (2006.01)

(52) U.S. Cl.
  CPC ......... *G06K 9/00798* (2013.01); *G08G 1/162* (2013.01); *B60R 2300/804* (2013.01)

(56) References Cited

U.S. PATENT DOCUMENTS

| | | |
|---|---|---|
| 2012/0300061 A1 | 11/2012 | Osman et al. |
| 2014/0163878 A1* | 6/2014 | Asano ................ G01C 21/3658 701/533 |
| 2016/0196098 A1 | 7/2016 | Roth et al. |
| 2018/0218611 A1 | 8/2018 | Nagura |
| 2019/0147263 A1 | 5/2019 | Kuehnle et al. |
| 2020/0168098 A1* | 5/2020 | Huang ................... G08G 1/167 |
| 2020/0369281 A1* | 11/2020 | Sato ................ B60W 30/18163 |

* cited by examiner

VIRTUAL VIEWING FRUSTUM

//METHOD AND DEVICE FOR LEARNING GENERATING LANE DEPARTURE WARNING (LDW) ALARM BY REFERRING TO INFORMATION ON DRIVING SITUATION TO BE USED FOR ADAS, V2X OR DRIVER SAFETY REQUIRED TO SATISFY LEVEL 4 AND LEVEL 5 OF AUTONOMOUS VEHICLES

CROSS REFERENCE TO RELATED APPLICATIONS

This application claims priority to U.S. patent application Ser. No. 16/263,220, now U.S. Pat. No. 10,553,118, filed 31 Jan. 2019, the entirety of which is hereby incorporated by reference.

FIELD OF THE DISCLOSURE

The present disclosure relates to a method and a device for use with an autonomous vehicle; and more particularly, to the method and the device for generating a lane departure warning (LDW) alarm by referring to information on a driving situation.

BACKGROUND OF THE DISCLOSURE

In the last 2015, about 1,747,000 traffic accidents occurred in the United States. At this time, 35,092 people were killed by traffic accidents. The number of deaths per 10,000 vehicles was 1.2 and the number of traffic accidents per 100,000 people was 10.9, which is the highest death rate among OECD countries. As can be seen from the statistics above, the problem of traffic accidents in the United States is very serious and it will be very important to prevent them.

Traffic accidents during lane changes occupy a high percentage among the entire traffic accidents. If one does not take a good look around when changing lanes, his or her vehicle is prone to collide with the cars in the surrounding lanes. Therefore, it is necessary to warn the driver of dangers when changing lanes.

However, a conventional lane departure warning (LDW) system merely detects whether a vehicle deviates from the lane but does not detect whether the driver takes a good look around during the lane change. Further, even when giving a warning to the driver, it is performed in a monotonous way, and thus it cannot satisfy needs generated by various driving environments.

SUMMARY OF THE DISCLOSURE

It is an object of the present disclosure to solve all the aforementioned problems.

It is another object of the present disclosure to reduce an accident probability of a driver by generating a lane departure warning (LDW) alarm by referring to whether a specific spot corresponding to a side-view mirror on a side of a lane, into which the driver desires to change, belongs to a virtual viewing frustum of the driver.

It is still another object of the present disclosure to send a warning signal to the driver more efficiently by adjusting an intensity and a frequency of the LDW alarm by referring to types of lanes or those of lane markings.

It is still yet another object of the present disclosure to guide a safe lane changing point by generating the LDW alarm for the driver by referring to GPS information on a destination and on a junction.

In accordance with one aspect of the present disclosure, there is provided a method for generating a lane departure warning (LDW) alarm by referring to information on a driving situation, including steps of: (a) a computing device, if information on a driver's lane changing intention is acquired, instructing a lane departure warning (LDW) system (i) to collect information on the driving situation including information on whether a specific spot corresponding to a side mirror on a side of a lane, into which the driver desires to change, belongs to a virtual viewing frustum of the driver and (ii) to generate risk information on lane change by referring to the information on the driving situation; and (b) the computing device instructing the LDW system to generate the LDW alarm by referring to the risk information on the lane change.

As one example, at the step of (a), on condition that it is detected that (i) a first viewing event, in which a vertical distance between a central axis of the virtual viewing frustum and the specific spot corresponding to the side mirror is within a first threshold distance, is generated a specific number of times corresponding to a first range within a first threshold time from a point of time of acquiring the information on the driver's lane changing intention or (ii) a second viewing event, in which a vertical distance between the central axis of the virtual viewing frustum and the specific spot corresponding to the side mirror exceeds the first threshold distance and is within a second threshold distance, is generated a certain number of times corresponding to a second range within the first threshold time from the point of time of acquiring the information on the driver's lane changing intention, the computing device instructs the LDW system to generate the risk information on the lane change, wherein a median value of the second range is greater than that of the first range.

As one example, at the step of (a), the computing device instructs the LDW system to collect information on the driving situation additionally including information on a road situation, and, at the step of (b), the computing device instructs the LDW system to adjust an intensity and a frequency of the LDW alarm by referring to the risk information on the lane change on which the information on the road situation is reflected.

As one example, at the step of (a), the information on the road situation includes information on shapes or colors of one or more lane markings located on at least one of both sides of the driver's vehicle, wherein the computing device instructs the LDW system to (i) determine at least one type of the lanes by referring to the information on the shapes or the colors of the lane markings and (ii) generate the risk information on the lane change on which information on the determined type of the lane markings is reflected.

As one example, at the step of (a), the computing device instructs the LDW system to set a degree of danger, included in the risk information on the lane change when a classification of the lane markings of the lane into which the driver desires to change is a k-th level, to be higher than a degree of danger, included in the risk information on the lane change when the classification of the lane markings of the lane into which the driver desires to change is a (k+1)-th level.

As one example, at the step of (a), (1) on condition that the classification of the lane markings of the lane into which the driver desires to change is the k-th level, if it is detected that (i) a first viewing event, in which a vertical distance between a central axis of the virtual viewing frustum and the specific spot corresponding to the side mirror is within a first threshold distance, is generated a first specific number of times corresponding to a (1_1)-st range within a first threshold time from a point of time of acquiring the information on the driver's lane changing intention or (ii) a second viewing event, in which a vertical distance between the central axis of the virtual viewing frustum and the specific spot corresponding to the side mirror is greater than the first threshold distance and is less than a second threshold distance, is generated a second specific number of times corresponding to a (2_1)-st range within the first threshold time from the point of time of acquiring the information on the driver's lane changing intention, the computing device instructs the LDW system to generate the risk information on the lane change including a degree of danger corresponding to a first risk range, (2) on condition that the classification of the lane markings of the lane into which the driver desires to change is the (k+1)-th level, if it is detected that (i) a first viewing event, in which a vertical distance between a central axis of the virtual viewing frustum and the specific spot corresponding to the side mirror is within a first threshold distance, is generated a third specific number of times corresponding to a (1_2)-nd range within the first threshold time from the point of time of acquiring the information on the driver's lane changing intention or (ii) a second viewing event, in which a vertical distance between the central axis of the virtual viewing frustum and the specific spot corresponding to the side mirror is greater than the first threshold distance and is less than the second threshold distance, is generated a fourth specific number of times corresponding to a (2_2)-nd range within the first threshold time from the point of time of acquiring the information on the driver's lane changing intention, the computing device instructs the LDW system to generate the risk information on the lane change including a degree of danger corresponding to a second risk range, wherein (i) a median value of the (2_1)-st range is greater than that of the (1_1)-st range, (ii) a median value of (2_2)-nd range is greater than that of the (1_2)-nd range, (iii) the median value of the (1_1)-st range is equal to or greater than that of the (1_2)-nd range, (iv) the median value of the (2_1)-st range is equal to or greater than that of the (2_2)-nd range, and (v) a median value of the first risk range is equal to or greater than that of the second risk range.

As one example, at the step of (a), (1) on condition that the classification of the lane markings of the lane into which the driver desires to change is the k-th level, if it is detected that (i) the first viewing event, in which the vertical distance between the central axis of the virtual viewing frustum and the specific spot corresponding to the side mirror is within the first threshold distance, is generated less than a fifth specific number of times corresponding to the (1_1)-st range within the first threshold time from the point of time of acquiring the information on the driver's lane changing intention or (ii) the second viewing event, in which the vertical distance between the central axis of the virtual viewing frustum and the specific spot corresponding to the side mirror is greater than the first threshold distance and is less than the second threshold distance, is generated less than a sixth specific number of times corresponding to the (2_1)-st range within the first threshold time from the point of time of acquiring the information on the driver's lane changing intention, the computing device instructs the LDW system to generate the risk information on the lane change including a degree of danger within a third risk range, (2) on condition that the classification of the lane markings of the lane into which the driver desires to change is the (k+1)-th level, if it is detected that (i) the first viewing event, in which the vertical distance between the central axis of the virtual viewing frustum and the specific spot corresponding to the side mirror is within the first threshold distance, is generated less than a seventh specific number of times corresponding to the (1_2)-nd range within the first threshold time from the point of time of acquiring the information on the driver's lane changing intention or (ii) the second viewing event, in which the vertical distance between the central axis of the virtual viewing frustum and the specific spot corresponding to the side mirror is greater than the first threshold distance and is less than the second threshold distance, is generated less than an eighth specific number of times corresponding to the (2_2)-nd range within the first threshold time from the point of time of acquiring the information on the driver's lane changing intention, the computing device instructs the LDW system to generate the risk information on the lane change including a degree of danger within a fourth risk range, wherein (i) the median value of the (2_1)-st range is greater than that of the (1_1)-st range, (ii) the median value of (2_2)-nd range is greater than that of the (1_2)-nd range, (iii) the median value of the (1_1)-st range is equal to or greater than that of the (1_2)-nd range, (iv) the median value of the (2_1)-st range is equal to or greater than that of the (2_2)-nd range, (v) a median value of the third risk range is equal to or greater than that of the fourth risk range, (vi) the median value of the fourth risk range is greater than that of the second risk range, and (vii) the median value of the third risk range is equal to or greater than that of the first risk range.

As one example, at the step of (a), the information on the road situation includes types of lanes where the driver's vehicle is located, and the computing device instructs the LDW system to determine a degree of danger when the driver changes the lane and to generate the risk information on the lane change including the degree of danger.

As one example, before the step of (a), a destination of the driver's vehicle is inputted to a global positioning system (GPS) module included in the computing device, and, at the step of (a), the computing device (1) acquires a potential intention related to the lane change by referring to information on the destination and on a junction existing within a predetermined distance from a current location of the driver's vehicle and determines the acquired potential intention as the information on the driver's lane changing intention and (2) instructs the LDW system to (i) collect the information on the driving situation additionally including location information on at least one specific lane moving to the destination, (ii) determine a triggering spot where the lane change is to be started to enter the specific lane, and (iii) generate the risk information on the lane change on which a result of the determined triggering spot is reflected.

As one example, at the step of (a), the computing device acquires a potential intention related to the lane change by referring to information on a destination of the driver's vehicle and a junction existing within a predetermined distance from a current location of the driver's vehicle and determines the acquired potential intention as the information on the driver's lane changing intention; at the step of (a), on condition that (I) (i) a first probability group, which is a set of probabilities of test vehicles moving from the junction to the destination through a first route, varies according to a distance between the junction and the current location, and includes each of first sub-probabilities allocated to each of lanes, and (ii) a second probability group, which is a set of probabilities of the test vehicles moving from the junction to the destination through a second route, varies according to a distance between the junction and the current location, and includes each of second sub-probabilities allocated to each of lanes, have been collected during a predetermined time, and (II) the information on the driving situation additionally including (i) location information on a first specific lane on which the test vehicles for moving to the destination through the first route were driving, the location information on the first specific lane varying according to the distance between the junction and each of current locations of each of the test vehicles and (ii) location information on a second specific lane on which the test vehicles for moving to the destination through the second route were driving, the location information on the second specific lane varying according to the distance between the junction and each of the current locations of each of the test vehicles, have been collected, the computing device instructs the LDW system to generate in real-time the risk information on the lane change including at least part of first risk information on the lane change and second risk information on the lane change, which are determined by referring to (i) real-time first comparison information between a current lane of the driver's vehicle and the first specific lane, (ii) real-time second comparison information between the current lane of the driver's vehicle and the second specific lane, and (iii) the first probability group and the second probability group, by using real-time weight information given to the first comparison information and the second comparison information; and, at the step of (b), the computing device instructs the LDW system to generate the LDW alarm by referring to at least part of the first risk information on the lane change and the second risk information on the lane change.

As one example, at the step of (a), the information on the driver's lane changing intention is acquired by referring to information on at least one direction indicator operated by the driver.

As one example, at the step of (a), the virtual viewing frustum is generated by referring to at least one image acquired by a camera attached to the side mirror.

In accordance with another aspect of the present disclosure, there is provided a computing device for generating a lane departure warning (LDW) alarm by referring to information on a driving situation, including: at least one memory that stores instructions; and at least one processor configured to execute the instructions to: perform processes of (I) if information on a driver's lane changing intention is acquired, instructing a lane departure warning (LDW) system (i) to collect information on the driving situation including information on whether a specific spot corresponding to a side mirror on a side of a lane, into which the driver desires to change, belongs to a virtual viewing frustum of the driver and (ii) to generate risk information on lane change by referring to the information on the driving situation, and (II) instructing the LDW system to generate the LDW alarm by referring to the risk information on the lane change.

As one example, at the process of (I), on condition that it is detected that (i) a first viewing event, in which a vertical distance between a central axis of the virtual viewing frustum and the specific spot corresponding to the side mirror is within a first threshold distance, is generated a specific number of times corresponding to a first range within a first threshold time from a point of time of acquiring the information on the driver's lane changing intention or (ii) a second viewing event, in which a vertical distance between the central axis of the virtual viewing frustum and the specific spot corresponding to the side mirror exceeds the first threshold distance and is within a second threshold distance, is generated a certain number of times corresponding to a second range within the first threshold time from the point of time of acquiring the information on the driver's lane changing intention, the processor instructs the LDW system to generate the risk information on the lane change, wherein a median value of the second range is greater than that of the first range.

As one example, at the process of (I), the processor instructs the LDW system to collect information on the driving situation additionally including information on a road situation, and, at the process of (II), the processor instructs the LDW system to adjust an intensity and a frequency of the LDW alarm by referring to the risk information on the lane change on which the information on the road situation is reflected.

As one example, at the process of (I), the information on the road situation includes information on shapes or colors of one or more lane markings located on at least one of both sides of the driver's vehicle, wherein the processor instructs the LDW system to (i) determine at least one type of the lanes by referring to the information on the shapes or the colors of the lane markings and (ii) generate the risk information on the lane change on which information on the determined type of the lane markings is reflected.

As one example, at the process of (I), the processor instructs the LDW system to set a degree of danger, included in the risk information on the lane change when a classification of the lane markings of the lane into which the driver desires to change is a k-th level, to be higher than a degree of danger, included in the risk information on the lane change when the classification of the lane markings of the lane into which the driver desires to change is a (k+1)-th level.

As one example, at the process of (I), (1) on condition that the classification of the lane markings of the lane into which the driver desires to change is the k-th level, if it is detected that (i) a first viewing event, in which a vertical distance between a central axis of the virtual viewing frustum and the specific spot corresponding to the side mirror is within a first threshold distance, is generated a first specific number of times corresponding to a (1_1)-st range within a first threshold time from a point of time of acquiring the information on the driver's lane changing intention or (ii) a second viewing event, in which a vertical distance between the central axis of the virtual viewing frustum and the specific spot corresponding to the side mirror is greater than the first threshold distance and is less than a second threshold distance, is generated a second specific number of times corresponding to a (2_1)-st range within the first threshold time from the point of time of acquiring the information on the driver's lane changing intention, the processor instructs the LDW system to generate the risk information on the lane change including a degree of danger corresponding to a first risk range, (2) on condition that the classification of the lane markings of the lane into which the driver desires to change is the (k+1)-th level, if it is detected that (i) a first viewing event, in which a vertical distance between a central axis of the virtual viewing frustum and the specific spot corresponding to the side mirror is within a first threshold distance, is generated a third specific number of times corresponding to a (1_2)-nd range within the first threshold time from the point of time of acquiring the information on the driver's lane changing intention or (ii) a second viewing event, in which a vertical distance between the central axis of the virtual viewing frustum and the specific spot corresponding to the side mirror is greater than the first threshold distance and is less than the second threshold distance, is generated a fourth specific number of times corresponding to a (2_2)-nd range within the first threshold time from the point of time of acquiring the information on the driver's lane changing intention, the processor instructs the LDW system to generate the risk information on the lane change including a degree of danger corresponding to a second risk range, wherein (i) a median value of the (2_1)-st range is greater than that of the (1_1)-st range, (ii) a median value of (2_2)-nd range is greater than that of the (1_2)-nd range, (iii) the median value of the (1_1)-st range is equal to or greater than that of the (1_2)-nd range, (iv) the median value of the (2_1)-st range is equal to or greater than that of the (2_2)-nd range, and (v) a median value of the first risk range is equal to or greater than that of the second risk range.

As one example, at the process of (I), (1) on condition that the classification of the lane markings of the lane into which the driver desires to change is the k-th level, if it is detected that (i) the first viewing event, in which the vertical distance between the central axis of the virtual viewing frustum and the specific spot corresponding to the side mirror is within the first threshold distance, is generated less than a fifth specific number of times corresponding to the (1_1)-st range within the first threshold time from the point of time of acquiring the information on the driver's lane changing intention or (ii) the second viewing event, in which the vertical distance between the central axis of the virtual viewing frustum and the specific spot corresponding to the side mirror is greater than the first threshold distance and is less than the second threshold distance, is generated less than a sixth specific number of times corresponding to the (2_1)-st range within the first threshold time from the point of time of acquiring the information on the driver's lane changing intention, the processor instructs the LDW system to generate the risk information on the lane change including a degree of danger within a third risk range, (2) on condition that the classification of the lane markings of the lane into which the driver desires to change is the (k+1)-th level, if it is detected that (i) the first viewing event, in which the vertical distance between the central axis of the virtual viewing frustum and the specific spot corresponding to the side mirror is within the first threshold distance, is generated less than a seventh specific number of times corresponding to the (1_2)-nd range within the first threshold time from the point of time of acquiring the information on the driver's lane changing intention or (ii) the second viewing event, in which the vertical distance between the central axis of the virtual viewing frustum and the specific spot corresponding to the side mirror is greater than the first threshold distance and is less than the second threshold distance, is generated less than an eighth specific number of times corresponding to the (2_2)-nd range within the first threshold time from the point of time of acquiring the information on the driver's lane changing intention, the processor instructs the LDW system to generate the risk information on the lane change including a degree of danger within a fourth risk range, wherein (i) the median value of the (2_1)-st range is greater than that of the (1_1)-st range, (ii) the median value of (2_2)-nd range is greater than that of the (1_2)-nd range, (iii) the median value of the (1_1)-st range is equal to or greater than that of the (1_2)-nd range, (iv) the median value of the (2_1)-st range is equal to or greater than that of the (2_2)-nd range, (v) a median value of the third risk range is equal to or greater than that of the fourth risk range, (vi) the median value of the fourth risk range is greater than that of the second risk range, and (vii) the median value of the third risk range is equal to or greater than that of the first risk range.

As one example, at the process of (I), the information on the road situation includes types of lanes where the driver's vehicle is located, and the processor instructs the LDW system to determine a degree of danger when the driver changes the lane and to generate the risk information on the lane change including the degree of danger.

As one example, before the process of (I), a destination of the driver's vehicle is inputted to a global positioning system (GPS) module included therein, and, at the process of (I), the processor (1) acquires a potential intention related to the lane change by referring to information on the destination and on a junction existing within a predetermined distance from a current location of the driver's vehicle and determines the acquired potential intention as the information on the driver's lane changing intention and (2) instructs the LDW system to (i) collect the information on the driving situation additionally including location information on at least one specific lane moving to the destination, (ii) determine a triggering spot where the lane change is to be started to enter the specific lane, and (iii) generate the risk information on the lane change on which a result of the determined triggering spot is reflected.

As one example, at the process of (I), the processor acquires a potential intention related to the lane change by referring to information on a destination of the driver's vehicle and a junction existing within a predetermined distance from a current location of the driver's vehicle and determines the acquired potential intention as the information on the driver's lane changing intention; at the process of (I), on condition that (I) (i) a first probability group, which is a set of probabilities of test vehicles moving from the junction to the destination through a first route, varies according to a distance between the junction and the current location, and includes each of first sub-probabilities allocated to each of lanes, and (ii) a second probability group, which is a set of probabilities of the test vehicles moving from the junction to the destination through a second route, varies according to a distance between the junction and the current location, and includes each of second sub-probabilities allocated to each of lanes, have been collected during a predetermined time, and (II) the information on the driving situation additionally including (i) location information on a first specific lane on which the test vehicles for moving to the destination through the first route were driving, the location information on the first specific lane varying according to the distance between the junction and each of current locations of each of the test vehicles and (ii) location information on a second specific lane on which the test vehicles for moving to the destination through the second route were driving, the location information on the second specific lane varying according to the distance between the junction and each of the current locations of each of the test vehicles, have been collected, the processor instructs the LDW system to generate in real-time the risk information on the lane change including at least part of first risk information on the lane change and second risk information on the lane change, which are determined by referring to (i) real-time first comparison information between a current lane of the driver's vehicle and the first specific lane, (ii) real-time second comparison information between the current lane of the driver's vehicle and the second specific lane, and (iii) the first probability group and the second probability group, by using real-time weight information given to the first comparison information and the second comparison information; and at the process of (II), the processor instructs the LDW system to generate the LDW alarm by referring to at least part of the first risk information on the lane change and the second risk information on the lane change.

As one example, at the process of (I), the information on the driver's lane changing intention is acquired by referring to information on at least one direction indicator operated by the driver.

As one example, at the process of (I), the virtual viewing frustum is generated by referring to at least one image acquired by a camera attached to the side mirror.

BRIEF DESCRIPTION OF THE DRAWINGS

The above and other objects and features of the present disclosure will become apparent from the following description of preferred embodiments given in conjunction with the accompanying drawings, in which.

DETAILED DESCRIPTION OF THE PREFERRED EMBODIMENTS

Figure 1:
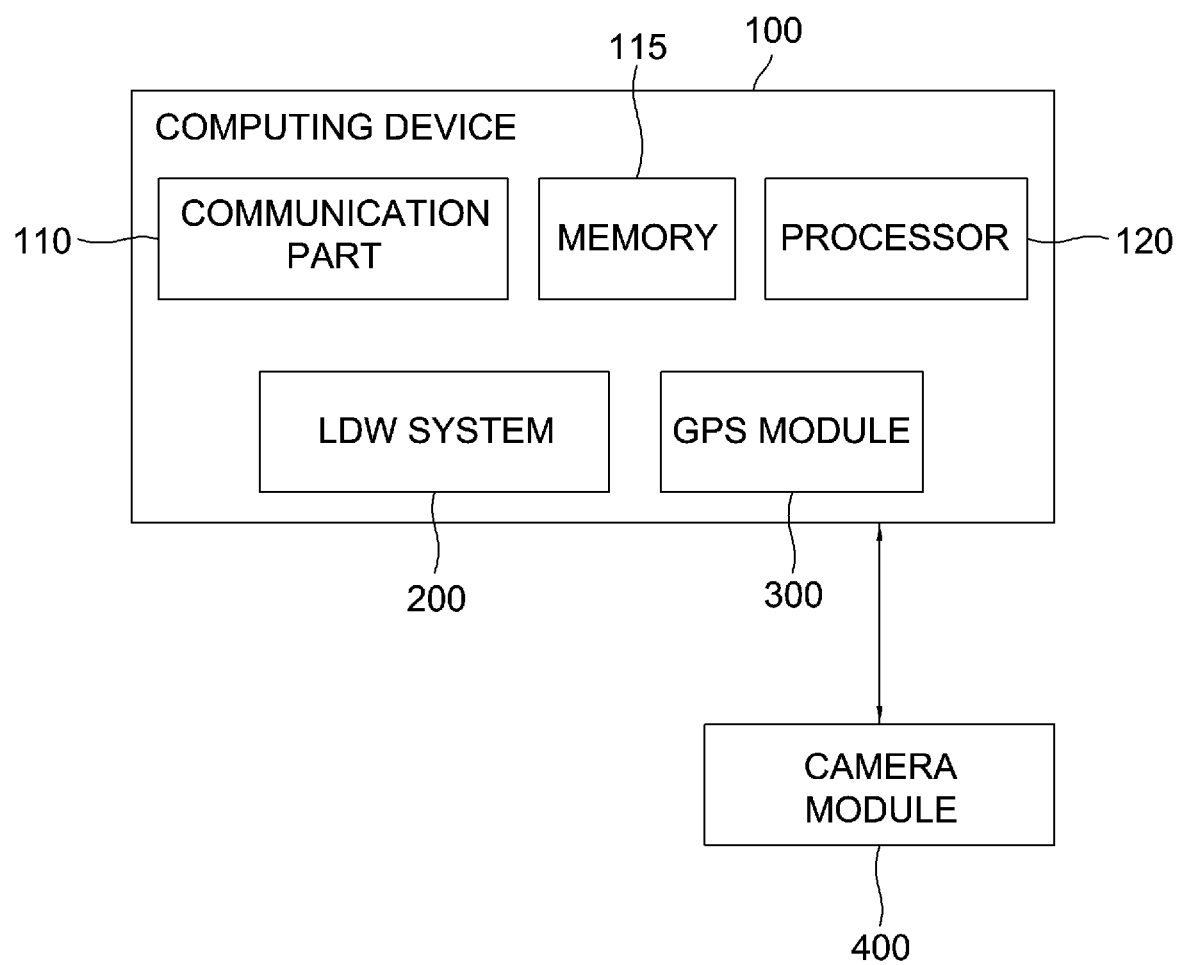
FIG. 1 is a drawing illustrating a configuration of a computing device for performing a method of generating a lane departure warning (LDW) alarm by referring to information on a driving situation in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

FIG. 1 is a drawing illustrating a configuration of a computing device for performing a method of generating a lane departure warning (LDW) alarm by referring to information on a driving situation in accordance with one example embodiment of the present disclosure.

Referring to FIG. 1, a computing device 100 may include an LDW system 200 and a GPS module 300. The input and output processes and the calculation processes of the LDW system 200 and the GPS module 300 can be performed by a communication part 110 and a processor 120, respectively. However, a detailed connection between the communication part 110 and the processor 120 is omitted in FIG. 1. In addition, a camera module 400 may or may not be included in the computing device 100. Herein, the computing device 100 and the camera module 400 may exchange data with each other. Further, the computing device may further include a memory 115 capable of storing computer readable instructions for performing following processes. As one example, the processor, the memory, a medium, etc. may be integrated with an integrated processor.

The configuration of a computing device capable of performing the method of generating the LDW alarm by referring to the information on the driving situation in accordance with one example embodiment of the present disclosure has been described above. Hereinafter, the method of generating the LDW alarm of the present disclosure will be described in detail.

First, the communication unit 110 can acquire information on a driver's lane changing intention. Since the present disclosure is basically performed in a situation where the driver intends to change lanes, the information on the lane changing intention should be obtained. This may be obtained by referring to information on whether a direction indicator is operated by the driver, or may be obtained by referring to information on a destination and a junction, inputted through UI provided by the GPS module 300, but the present disclosure is not limited to this example.

Thereafter, the computing device 100 instructs the LDW system 200 to collect information on the driving situation including information on whether a specific spot corresponding to a side mirror on a side of a lane, into which the driver desires to change, belongs to a virtual viewing frustum of the driver.

The virtual viewing frustum will be described by referring to FIG. 2.

Figure 2:
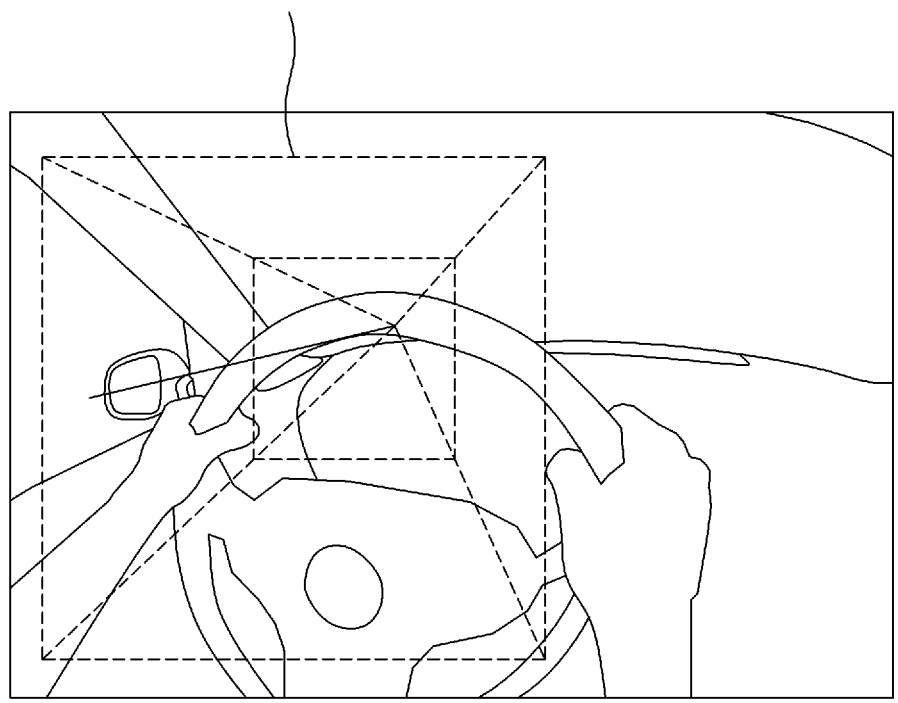
FIG. 2 is a drawing illustrating a virtual viewing frustum from a driver's point of view in accordance with one example embodiment of the present disclosure.

FIG. 2 is a drawing illustrating a virtual viewing frustum (displayed as dotted lines) from a driver's point of view in accordance with one example embodiment of the present disclosure.

A quadrangular pyramid cut at the top side thereof in FIG. 2 is a shape of the virtual viewing frustum. This is the modeling of the driver's field of view. It can be determined that, as the vertical distance between an object and the central axis of the virtual viewing frustum becomes smaller, the driver is more accurately gazing at the object. It can also be determined that, as the vertical distance between the object and the central axis becomes greater, the driver is less accurately gazing at the object.

Such a virtual viewing frustum can be estimated by the computing device 100 by referring to an image including a driver obtained by the camera module 400 mounted on the side mirror. The computing device 100 can recognize the driver's head direction and pupil direction to thereby generate the virtual viewing frustum.

It is possible to determine whether the driver accurately gazes at the side mirror by detecting viewing events, which are events in which the vertical distance between the center axis of the virtual viewing frustum and the side mirror is equal to or less than a predetermined threshold distance.

Specifically, on condition that it is detected that (i) a first viewing event, in which a vertical distance between a central axis of the virtual viewing frustum and the specific spot corresponding to the side mirror is within a first threshold distance, is generated a specific number of times corresponding to a first range within a first threshold time from a point of time of acquiring the information on the driver's lane changing intention or (ii) a second viewing event, in which a vertical distance between the central axis of the virtual viewing frustum and the specific spot corresponding to the side mirror exceeds the first threshold distance and is within a second threshold distance, is generated a certain number of times corresponding to a second range within the first threshold time from the point of time of acquiring the information on the driver's lane changing intention, the computing device instructs the LDW system to generate the risk information on lane change. Herein, a median value of the second range is greater than that of the first range. For example, if the first range includes 1 to 2 times, the second range may include 3 to 5 times. If the first range includes 1 to 4 times, the second range may include 3 to 6 times.

The first viewing event is a case where the vertical distance between the central axis of the virtual viewing frustum and the specific spot corresponding to the side mirror is within the first threshold distance. This is a case where the driver is accurately gazing at the side mirror. The second viewing event is a case where the vertical distance between the central axis of the virtual viewing frustum and the specific spot corresponding to the side mirror exceeds the first threshold distance and is within the second threshold distance. This is a case where the driver is looking at the side mirror from the corner of his or her eyes.

When the driver is looking at the side mirror from the corner of his or her eyes, the driver should generate the second viewing event much more than the first viewing event to clearly recognize the surrounding situation of the vehicle.

The scheme of calculating the vertical distance between the central axis of the virtual viewing frustum and the specific spot corresponding to the side mirror will be described by referring to FIG. 3.

Figure 3:
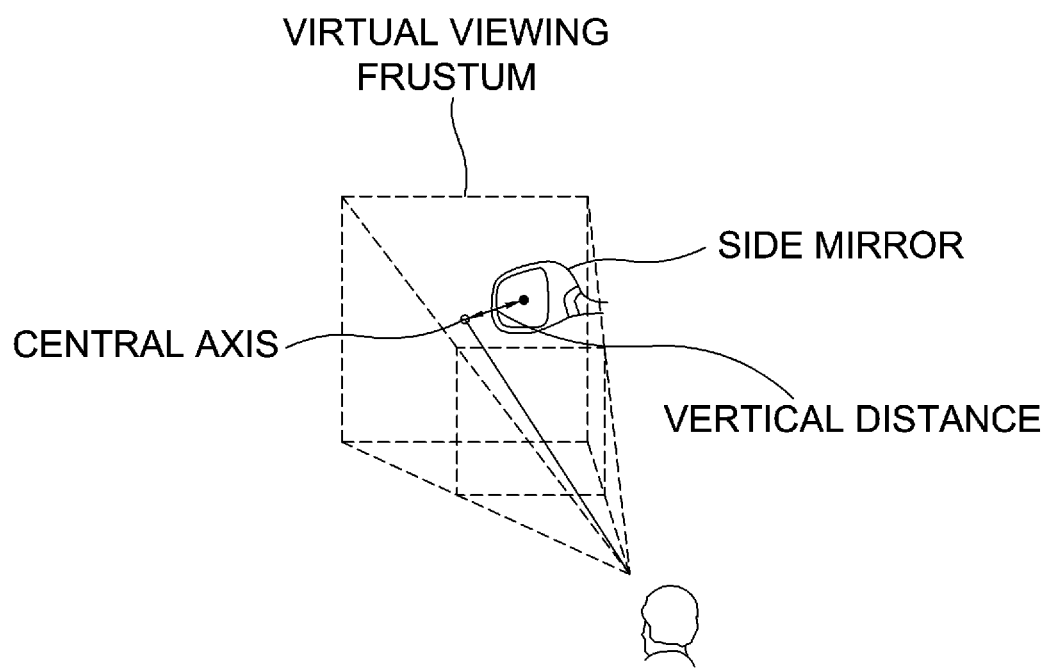
FIG. 3 is a drawing illustrating a process of calculating a vertical distance for determining whether a specific point corresponding to a side mirror belongs to the virtual viewing frustum in accordance with one example embodiment of the present disclosure.

Referring to FIG. 3, the central axis of the virtual viewing frustum is shown. The specific point of the side mirror may be the central point of the side mirror as shown in FIG. 3 and may also be a location (not shown) of the camera module 400 attached to the side mirror, but the present disclosure is not limited to this example. Likewise, as shown in FIG. 3, the shortest distance between the central axis of the virtual viewing frustum and the specific point of the side mirror may be calculated, and thus the first viewing event or the second viewing event can be detected.

If (i) the first viewing event is generated the specific number of times corresponding to the first range or (ii) the second viewing event is generated the certain number of times corresponding to the second range, it can be determined that the driver has sufficiently checked the surrounding situation of the vehicle. As such, the computing device 100 can instruct the LDW system 200 to generate risk information on lane change having a relatively low risk. Herein, if both the first viewing event and the second viewing event are not generated up to the specific number of times and the certain number of times respectively, it can be determined that the driver has not sufficiently checked the surrounding situation of the vehicle, and thus the computing device 100 may instruct the LDW system 200 to generate risk information on lane change having a relatively high risk.

If the risk information is generated according to the above scheme, the computing device 100 may instruct the LDW system 200 to generate an LDW alarm by referring to the risk information on lane change. When referring to the risk information on lane change having a relatively high risk, the computing device 100 may instruct the LDW system 200 to generate the LDW alarm, and when referring to the risk information on lane change having a relatively low risk, the computing device 100 may instruct the LDW system 200 not to generate the LDW alarm or to generate the LDW alarm very slightly. It is also possible to set a predetermined value and it may be determined whether to generate the LDW alarm according to whether the risk is equal to or greater than the predetermined value, but the present disclosure is not limited to these examples.

According to the above-described embodiment of the present disclosure, the LDW alarm is generated by determining whether the user is appropriately gazing at the side mirror. As another example, the LDW alarm may also be generated by utilizing extrinsic information, which will be described below.

First of all, information on the driving situation may additionally include information on the road situation as well as information associated with the virtual viewing frustum. The information on the road situation may include information on shapes or colors of lane markings located on both sides of the driver's vehicle. Herein, the computing device 100 may instruct the LDW system 200 to (i) determine at least one type of the lane markings by referring to shape or color information of the lane markings and (ii) generate the risk information on lane change on which information on the determined type of the lane markings is reflected.

The process of determining the types of the lane markings will be described by referring to FIG. 4.

Figure 4:
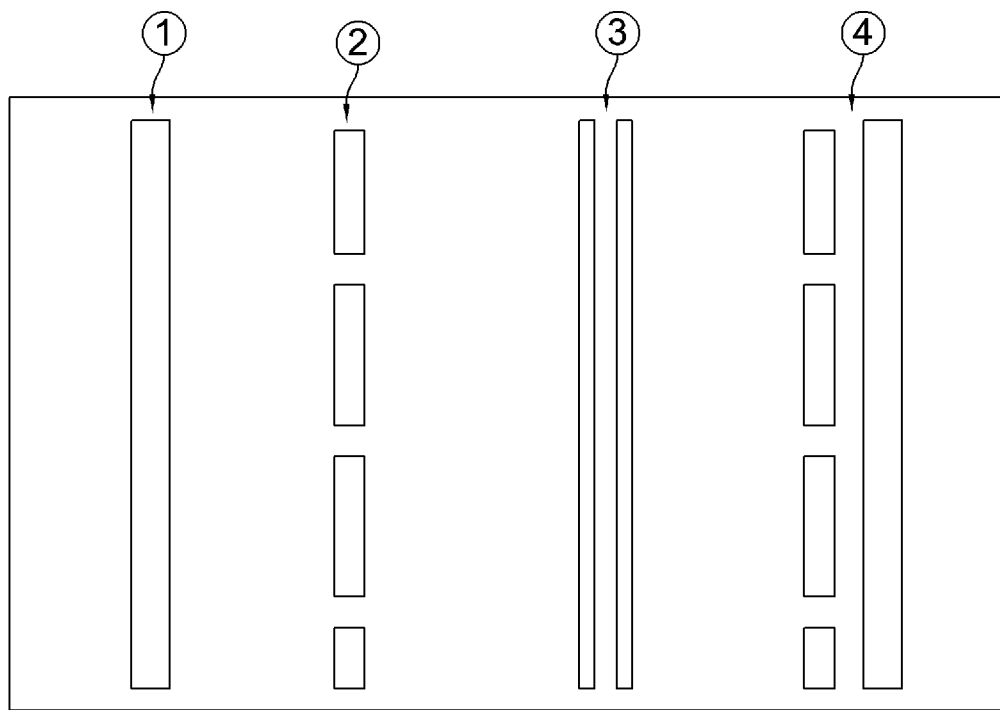
FIG. 4 is a drawing illustrating shapes of lane markings on at least one of both sides of the driver's vehicle among information collected by an LDW system in accordance with one example embodiment of the present disclosure.

FIG. 4 is a drawing illustrating shapes of lane markings on both sides of the driver's vehicle among information collected by the LDW system in accordance with one example embodiment of the present disclosure.

Referring to FIG. 4, there are various types of the lane markings such as a solid line lane where lane change is not allowed, a general dotted lane, a two-line lane which is a centerline, and a half-dotted line which allows a vehicle to move from left to right only. The risks of the lane change are very different depending on the types of these lanes markings. The types of the lane markings may be determined by checking shapes and colors thereof. In case of the general dotted lane, the lane change is allowed, and thus it may be determined that the risk is relatively low. On the other hand, a yellow two-line lane is a centerline, and thus it may be determined that the risk is very high. Likewise, a degree of danger included in the risk information on the lane change may be set by referring to the types of the lane markings.

Namely, the computing device 100 may instruct the LDW system 200 to set the degree of danger, included in the risk information on the lane change when a classification of the lane into which the driver desires to change is a k-th level, to be higher than a degree of danger, included in the risk information on the lane change when the classification of the lane into which the driver desires to change is a (k+1)-th level.

It is also possible to perform the method of generating the LDW alarm by using the types of the lane markings and by further using the scheme of determining whether the driver is gazing at the side mirror as shown in FIG. 3. Namely, the computing device 100 may determine a level of a lane by referring to its shape and its color and set a high degree of danger to a lane having a high level. Further, the computing device 100 may determine more strictly whether the driver is gazing at the side mirror.

Namely, (1) on condition that the level of the lane into which the driver desires to change is the k-th level, if it is detected that (i) a first viewing event, in which the vertical distance between the central axis of the virtual viewing frustum and the specific spot corresponding to the side mirror is within the first threshold distance, is generated a first specific number of times corresponding to a (1_1)-st range within a first threshold time from the point of time of acquiring the information on the driver's lane changing intention or (ii) a second viewing event, in which the vertical distance between the central axis of the virtual viewing frustum and the specific spot corresponding to the side mirror is greater than the first threshold distance and is less than the second threshold distance, is generated a second specific number of times corresponding to a (2_1)-st range within the first threshold time from the point of time of acquiring the information on the driver's lane changing intention, the computing device instructs the LDW system to generate the risk information on the lane change, the risk information including a degree of danger corresponding to a first risk range, and (2) on condition that the level of the lane into which the driver desires to change is the (k+1)-th level, if it is detected that (i) the first viewing event, in which the vertical distance between the central axis of the virtual viewing frustum and the specific spot corresponding to the side mirror is within the first threshold distance, is generated a third specific number of times corresponding to a (1_2)-nd range within the first threshold time from the point of time of acquiring the information on the driver's lane changing intention or (ii) the second viewing event, in which the vertical distance between the central axis of the virtual viewing frustum and the specific spot corresponding to the side mirror is greater than the first threshold distance and is less than the second threshold distance, is generated a fourth specific number of times corresponding to a (2_2)-nd range within the first threshold time from the point of time of acquiring the information on the driver's lane changing intention, the computing device 100 may instruct the LDW system 200 to generate the risk information on the lane change, the risk information including a degree of danger corresponding to a second risk range.

Herein, (i) a median value of the (2_1)-st range may be greater than that of the (1_1)-st range, (ii) a median value of (2_2)-nd range may be greater than that of the (1_2)-nd range, (iii) the median value of the (1_1)-st range may be equal to or greater than that of the (1_2)-nd range, (iv) the median value of the (2_1)-st range may be equal to or greater than that of the (2_2)-nd range, and (v) a median value of the first risk range may be equal to or greater than that of the second risk range.

Further, on condition that the level of the lane into which the driver desires to change is the k-th level, if it is detected that (i) the first viewing event, in which the vertical distance between the central axis of the virtual viewing frustum and the specific spot corresponding to the side mirror is within the first threshold distance, is generated less than a fifth specific number of times corresponding to the (1_1)-st range within the first threshold time from the point of time of acquiring the information on the driver's lane changing intention or (ii) the second viewing event, in which the vertical distance between the central axis of the virtual viewing frustum and the specific spot corresponding to the side mirror is greater than the first threshold distance and is less than the second threshold distance, is generated less than a sixth specific number of times corresponding to the (2_1)-st range within the first threshold time from the point of time of acquiring the information on the driver's lane changing intention, the computing device instructs the LDW system to generate the risk information on the lane change, the risk information including a degree of danger corresponding to a third risk range, and (2) on condition that the level of the lane into which the driver desires to change is the (k+1)-th level, if it is detected that (i) the first viewing event, in which the vertical distance between the central axis of the virtual viewing frustum and the specific spot corresponding to the side mirror is within the first threshold distance, is generated less than a seventh specific number of times corresponding to the (1_2)-nd range within the first threshold time from the point of time of acquiring the information on the driver's lane changing intention or (ii) the second viewing event, in which the vertical distance between the central axis of the virtual viewing frustum and the specific spot corresponding to the side mirror is greater than the first threshold distance and is less than the second frequency distance, is generated less than an eighth specific number of times corresponding to the (2_2)-nd range within the first threshold time from the point of time of acquiring the information on the driver's lane changing intention, the computing device 100 may instruct the LDW system 200 to generate the risk information on the lane change, the risk information including a degree of danger within a fourth risk range.

Herein, (i) the median value of the (2_1)-st range may be greater than that of the (1_1)-st range, (ii) the median value of (2_2)-nd range may be greater than that of the (1_2)-nd range, (iii) the median value of the (1_1)-st range may be equal to or greater than that of the (1_2)-nd range, (iv) the median value of the (2_1)-st range may be equal to or greater than that of the (2_2)-nd range, (v) a median value of the third risk range may be equal to or greater than that of the fourth risk range, (vi) the median value of the fourth risk range may be greater than that of the second risk range, and (vii) the median value of the third risk range may be equal to or greater than that of the first risk range.

Figure 5:
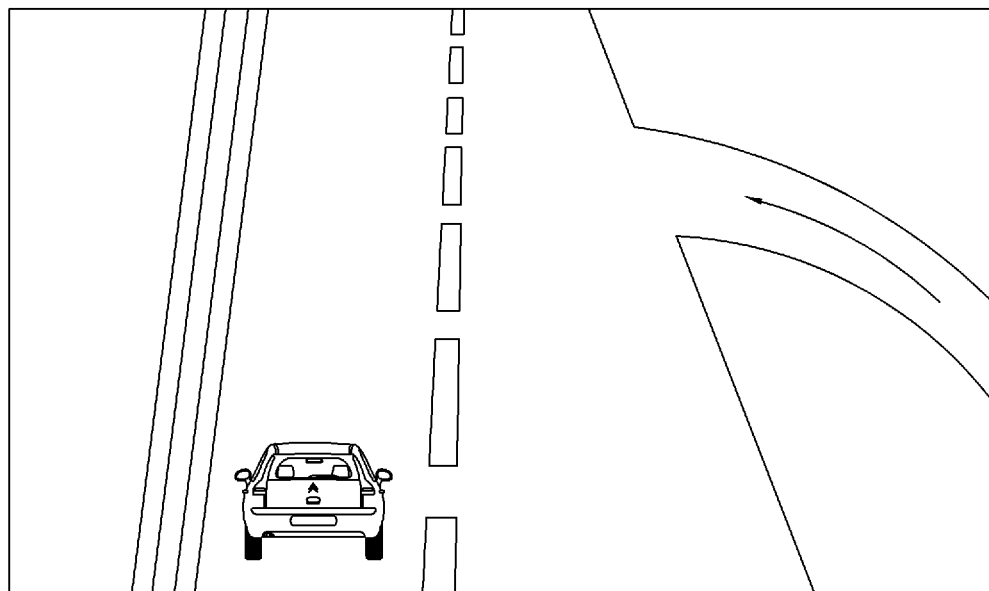
FIG. 5 is a drawing illustrating a type of a lane, e.g., a merged lane, among information collected by the LDW system in accordance with one example embodiment of the present disclosure.

FIG. 5 is a drawing illustrating a type of a lane, e.g., a merged lane, among information collected by the LDW system in accordance with one example embodiment of the present disclosure.

On condition that the lane into which the driver desires to change is a merged lane as shown in FIG. 5, if the driver moves to the merged lane, danger of accident increases. Hence, at this time, the computing device 100 may instruct the LDW system 200 to generate risk information on the lane change including a relatively high degree of danger. In other cases, namely, when the lane into which the driver desires to change is merely a straight lane, the computing device 100 may instruct the LDW system 200 to generate risk information on the lane change including a relatively low degree of danger.

The scheme of generating risk information on the lane change by referring to the types of lane markings was explained above. Hereinafter, a scheme of generating risk information on the lane change will be explained by referring to information on a set destination.

First of all, if a destination of a vehicle is inputted through UI provided by the GPS module 300, information on the destination may be delivered to the GPS module 300. The GPS module 300 may provide the driver with a route to the destination.

Thereafter, the computing device 100 (1) may acquire potential intention related to the lane change by referring to information on the destination and a junction existing within a predetermined distance from a current location of the driver's vehicle and may determine the acquired potential intention as the information on the driver's lane changing intention and (2) may instruct the LDW system to (i) collect the information on the driving situation additionally including location information on at least one specific lane for moving to the destination, (ii) determine a triggering spot where a lane change is to be started to enter the specific lane, and (iii) generate the risk information on the lane change on which a result of the determined triggering spot is reflected.

This scheme will be described in detail by referring to FIG. 6.

Figure 6:
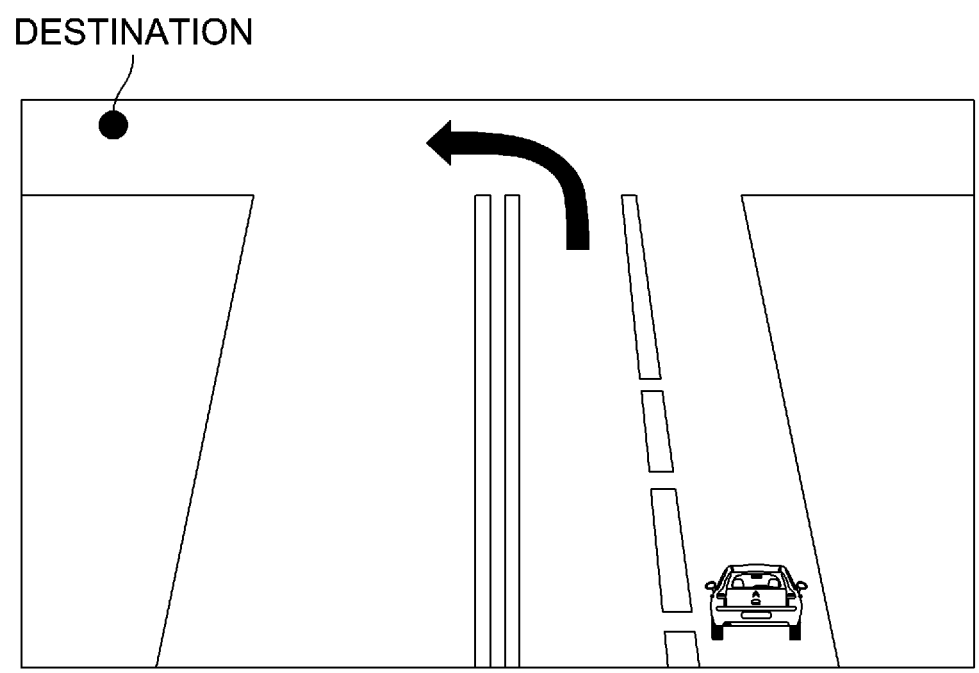
FIG. 6 is a drawing illustrating a case in which a vehicle needs to change lanes to move from a predetermined junction in a direction towards the destination in accordance with one example embodiment of the present disclosure.

FIG. 6 is a drawing illustrating a case in which a vehicle needs to change lanes to move from a predetermined junction in a direction towards the destination in accordance with one example embodiment of the present disclosure.

As shown in FIG. 6, if the driver needs to turn left to go to the destination while driving on a straight lane, it may be understood that the driver has a potential intention for changing lanes. Therefore, the computing device 100 may regard such potential intention as the driver's lane changing intention.

However, as illustrated in FIG. 6, if the driver changes the lanes in order to change a course, the driver needs to change the lanes before reaching the junction in many cases. For example, in order to move to a lane where the driver can turn left, the driver needs to change lanes before reaching a solid line lane. Herein, changing the lanes means moving to a lane on the right side or a lane on the left side, and changing the course means turning right, turning left, making a U-turn, etc.

Therefore, the computing device 100 may instruct the LDW system 200 to determine a triggering spot where a lane change is to be started to enter the specific lane by referring to location information of the specific lane to be used for moving to the destination. Further, the computing device 100 may generate the risk information on the lane change on which a result of the determined triggering spot is reflected. According to the scheme, the driver may receive the alarm of the LDW system so that the driver may safely enter the specific lane.

However, according to the scheme, if the drivers use routes other than a route guided by the GPS module 300, unnecessary alarms may be generated. Therefore, the following additional algorithms may be used. First of all, it is assumed that (i) a first probability group, which is a set of probabilities of test vehicles moving from the junction to the destination through a first route, varies according to a distance between the junction and the current location, and includes first sub-probabilities allocated to each of lanes, and (ii) a second probability group, which is a set of probabilities of the test vehicles moving from the junction to the destination through a second route, varies according to the distance between the junction and the current location, and includes second sub-probabilities allocated to each of lanes, have been collected during a predetermined time.

The first probability group and the second probability group will be described below by referring to FIG. 7.

Figure 7:
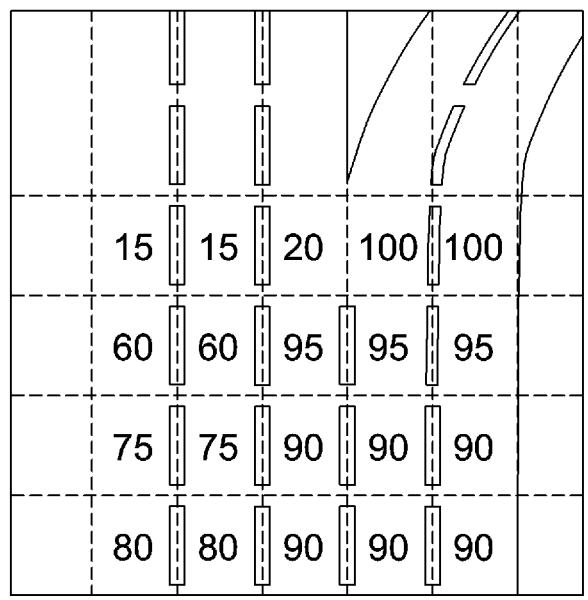
FIG. 7 is a drawing illustrating an example of generating an LDW alarm by using probability information allocated to each lane varying according to a distance between a junction and a current location of a vehicle, in case there are a straight route and a right turn route as routes to the destination in accordance with one example embodiment of the present disclosure.

FIG. 7 is a drawing illustrating an example of generating an LDW alarm by using probability information allocated to each lane in accordance with one example embodiment of the present disclosure.

First of all, in order to acquire the probability information as shown in FIG. 7, the computing device 100 may instruct the LDW system 200 to collect (I) the information on the driving situation additionally including (i) location information on a first specific lane on which the test vehicles for moving to the destination through the first route were driving, the location information on the first specific lane varying according to the distance between the junction and current locations of the test vehicles and (ii) location information on a second specific lane on which the test vehicles for moving to the destination through the second route were driving, the location information on the second specific lane varying according to the distance between the junction and the current locations of the test vehicles, (II) the first probability group and (III) the second probability group.

As an example, each of probabilities shown in FIG. 7 is each of the second sub-probabilities in case each of sub-probabilities of the second probability group is higher than each of sub-probabilities of the first probability group. Referring to FIG. 7, when the vehicle is still far away from the junction, even if the vehicle is not located on a lane where the driver can directly use the second route, the driver can easily change lanes to use the second route, and thus it can be determined that it is highly probable that the vehicle will move to a right lane to use the second route. In the same situation, if the vehicle has not moved to the right lane even until getting close to the junction, it can be determined that it is not probable that the vehicle will move to the right lane to use the second route.

Thereafter, the computing device 100 may instruct the LDW system 200 to generate the risk information on the lane change including at least part of first risk information on lane change and second risk information on lane change, which are determined by referring to (i) real-time first comparison information between a current lane of the driver's vehicle and the first specific lane, (ii) real-time second comparison information between the current lane of the driver's vehicle and the second specific lane, and (iii) the first probability group and the second probability group, by using real-time weight information given to the first comparison information and the second comparison information.

Further, the computing device 100 may instruct the LDW system 200 to generate the LDW alarm by referring to at least part of the first risk information on the lane change and the second risk information on the lane change.

This is for mainly generating the LDW alarm for a route having a high probability of being selected by the driver by checking routes which have generally been selected by the drivers, which will be described below by referring to FIG. 8.

Figure 8:
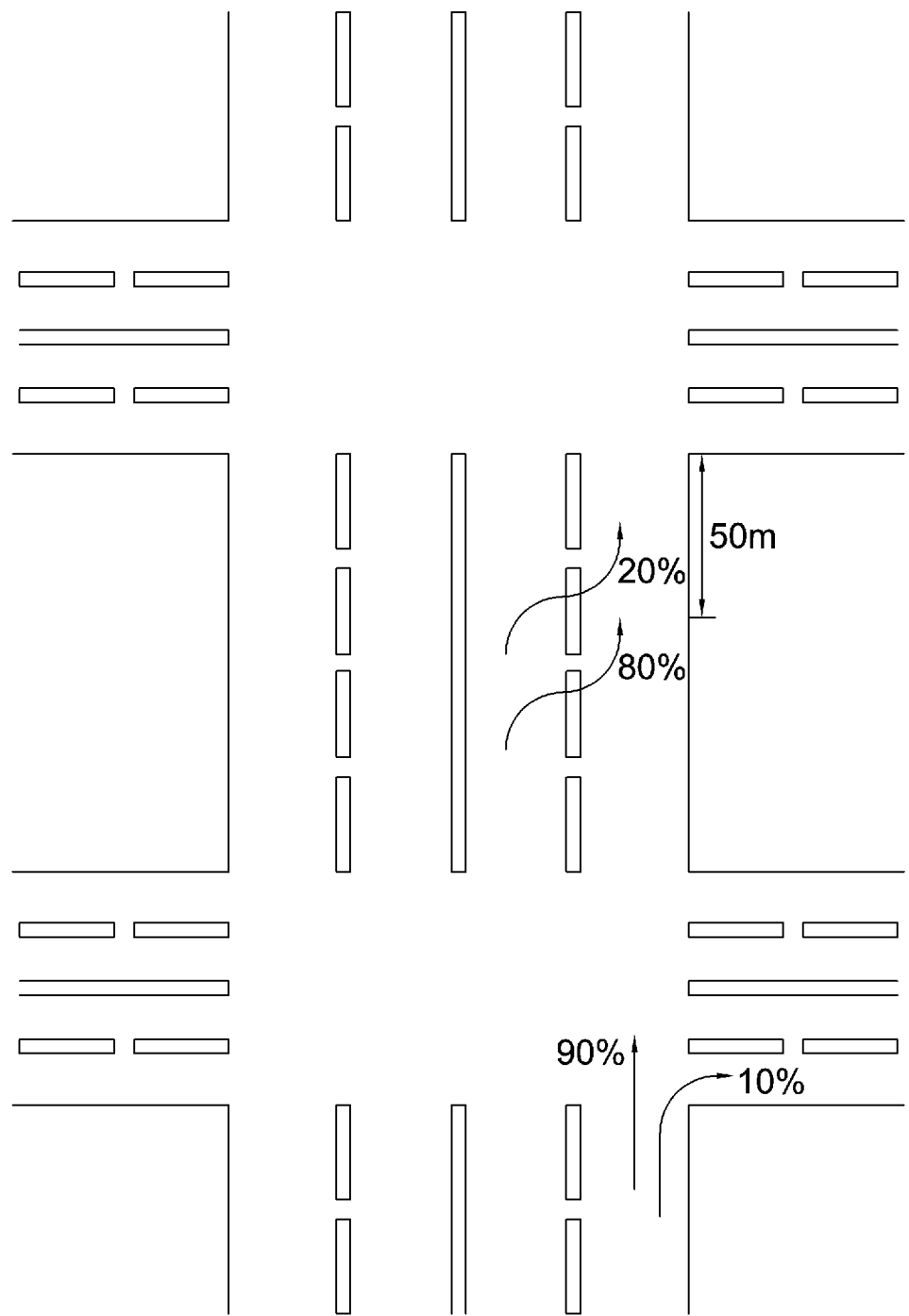
FIG. 8 is a drawing specifically illustrating a scheme of referring to probability information allocated for each lane when there are a plurality of routes to the destination in accordance with one example embodiment of the present disclosure.

FIG. 8 is a drawing specifically illustrating a scheme of referring to probability information allocated to each lane when there are a plurality of routes to the destination in accordance with one example embodiment of the present disclosure.

It is assumed that there are a first route of turning right at a first junction and a second route of going straight at the first junction and turning right at a second junction in order to go to the destination. Referring to FIG. 8, it can be seen that, for a predetermined past time, test vehicles have selected the second route that makes the right turn at the second junction with a 90 percent probability. It can also be seen that, at the time of selecting the second route, the probability that the test vehicles will change to the right turn lane by 50 m before reaching the second junction is 80 percent. At this time, if the driver does not change to the right turn lane at the first junction, the computing device 100 may instruct the LDW system 200 to generate a relatively weak LDW alarm. This is because the probability of selecting the first route to make a right turn at the first junction is only 10 percent and thus it cannot be said that the driver has a potential intention of changing lanes. However, even if it is 50 m before reaching the second junction after passing through the first junction, if the vehicle has not moved to the right turn lane, the LDW system 100 will be able to generate a relatively strong LDW alarm. This is because the possibility of changing to the right turn lane before 50 m before reaching the junction in order to make a right turn at the second junction is very high and thus it can be said that the driver has a potential intention of changing lanes.

Unlike the above example, if the probabilities of selecting the first route and the second route are 50%, respectively, the LDW alarm at the first junction may be stronger than that in the above example. Namely, the LDW alarm corresponding to the route having a high probability of being selected will be stronger than that corresponding to the route having a low probability of being selected.

If a computing device performing such a method of generating the LDW alarm is mounted on a vehicle, car accidents occurring during a lane change situation will be reduced by providing the LDW alarm to neighboring autonomous vehicles of level 4 and level 5. Also, the method may be used for ADAS, V2X or driver safety which are required to satisfy level 4 and level 5 of autonomous vehicles.

The present disclosure has an effect of reducing an accident probability of the driver by generating the LDW alarm by referring to whether the driver has sufficiently checked a side mirror of a side of a lane into which a driver desires to change.

The present disclosure has another effect of sending a warning signal to the driver more efficiently by adjusting the intensity and the frequency of the LDW alarm by referring to types of lanes.

The present disclosure has still another effect of guiding a safe triggering spot where a lane change is to be started to enter the specific lane by generating the LDW alarm to the driver by referring to destination information and junction information on the GPS.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for generating a lane departure warning (LDW) alarm by referring to information on a driving situation, comprising steps of:
   (a) a computing device, if a destination of a driver's vehicle has been inputted to a Global Positioning System(GPS) module included therein, instructing a lane departure warning(LDW) system (i) to acquire a potential intention related to a lane change by referring to information on the destination and on a junction existing within a predetermined distance from a current location of the driver's vehicle and determines the acquired potential intention, (ii) to collect information on the driving situation including (ii-1) information on whether a specific spot corresponding to a side mirror on a side of a lane, into which the driver desires to change, belongs to a virtual viewing frustum of the driver and (ii-2) location information on at least one specific lane moving to the destination, (iii) to determine a triggering spot where the lane change is to be started to enter the specific lane by referring to the information on the driving situation, and (iv) to generate risk information on lane change, by referring to the information on the driving situation and information on the triggering spot; and (b) the computing device instructing the LDW system to generate the LDW alarm by referring to the risk information on the lane change.

2. The method of claim 1, wherein, at the step of (a), on condition that it is detected that (i) a first viewing event, in which a vertical distance between a central axis of the virtual viewing frustum and the specific spot corresponding to the side mirror is within a first threshold distance, is generated a specific number of times corresponding to a first range within a first threshold time from a point of time of acquiring the information on the driver's lane changing intention or (ii) a second viewing event, in which a vertical distance between the central axis of the virtual viewing frustum and the specific spot corresponding to the side mirror exceeds the first threshold distance and is within a second threshold distance, is generated a certain number of times corresponding to a second range within the first threshold time from the point of time of acquiring the information on the driver's lane changing intention, the computing device instructs the LDW system to generate the risk information on the lane change, and wherein a median value of the second range is greater than that of the first range.

3. The method of claim 1, wherein, at the step of (a), the computing device instructs the LDW system to collect information on the driving situation additionally including information on a road situation, and wherein, at the step of (b), the computing device instructs the LDW system to adjust an intensity and a frequency of the LDW alarm by referring to the risk information on the lane change on which the information on the road situation is reflected.

4. The method of claim 3, wherein, at the step of (a), the information on the road situation includes information on shapes or colors of one or more lane markings located on at least one of both sides of the driver's vehicle, and wherein the computing device instructs the LDW system to (i) determine at least one type of the lanes by referring to the information on the shapes or the colors of the lane markings and (ii) generate the risk information on the lane change on which information on the determined type of the lane markings is reflected.

5. The method of claim 4, wherein, at the step of (a), the computing device instructs the LDW system to set a degree of danger, included in the risk information on the lane change when a classification of the lane markings of the lane into which the driver desires to change is a k-th level, to be higher than a degree of danger, included in the risk information on the lane change when the classification of the lane markings of the lane into which the driver desires to change is a (k+1)-th level.

6. The method of claim 5, wherein, at the step of (a), (1) on condition that the classification of the lane markings of the lane into which the driver desires to change is the k-th level, if it is detected that (i) a first viewing event, in which a vertical distance between a central axis of the virtual viewing frustum and the specific spot corresponding to the side mirror is within a first threshold distance, is generated a first specific number of times corresponding to a (1_1)-st range within a first threshold time from a point of time of acquiring the information on the driver's lane changing intention or (ii) a second viewing event, in which a vertical distance between the central axis of the virtual viewing frustum and the specific spot corresponding to the side mirror is greater than the first threshold distance and is less than a second threshold distance, is generated a second specific number of times corresponding to a (2_1)-st range within the first threshold time from the point of time of acquiring the information on the driver's lane changing intention, the computing device instructs the LDW system to generate the risk information on the lane change including a degree of danger corresponding to a first risk range, (2) on condition that the classification of the lane markings of the lane into which the driver desires to change is the (k+1)-th level, if it is detected that (i) a first viewing event, in which a vertical distance between a central axis of the virtual viewing frustum and the specific spot corresponding to the side mirror is within a first threshold distance, is generated a third specific number of times corresponding to a (1_2)-nd range within the first threshold time from the point of time of acquiring the information on the driver's lane changing intention or (ii) a second viewing event, in which a vertical distance between the central axis of the virtual viewing frustum and the specific spot corresponding to the side mirror is greater than the first threshold distance and is less than the second threshold distance, is generated a fourth specific number of times corresponding to a (2_2)-nd range within the first threshold time from the point of time of acquiring the information on the driver's lane changing intention, the computing device instructs the LDW system to generate the risk information on the lane change including a degree of danger corresponding to a second risk range, and wherein (i) a median value of the (2_1)-st range is greater than that of the (1_1)-st range, (ii) a median value of (2_2)-nd range is greater than that of the (1_2)-nd range, (iii) the median value of the (1_1)-st range is equal to or greater than that of the (1_2)-nd range, (iv) the median value of the (2_1)-st range is equal to or greater than that of the (2_2)-nd range, and (v) a median value of the first risk range is equal to or greater than that of the second risk range.

7. The method of claim 6, wherein, at the step of (a), (1) on condition that the classification of the lane markings of the lane into which the driver desires to change is the k-th level, if it is detected that (i) the first viewing event, in which the vertical distance between the central axis of the virtual viewing frustum and the specific spot corresponding to the side mirror is within the first threshold distance, is generated less than a fifth specific number of times corresponding to the (1_1)-st range within the first threshold time from the point of time of acquiring the information on the driver's lane changing intention or (ii) the second viewing event, in which the vertical distance between the central axis of the virtual viewing frustum and the specific spot corresponding to the side mirror is greater than the first threshold distance and is less than the second threshold distance, is generated less than a sixth specific number of times corresponding to the (2_1)-st range within the first threshold time from the point of time of acquiring the information on the driver's lane changing intention, the computing device instructs the LDW system to generate the risk information on the lane change including a degree of danger within a third risk range, (2) on condition that the classification of the lane markings of the lane into which the driver desires to change is the (k+1)-th level, if it is detected that (i) the first viewing event, in which the vertical distance between the central axis of the virtual viewing frustum and the specific spot corresponding to the side mirror is within the first threshold distance, is generated less than a seventh specific number of times corresponding to the (1_2)-nd range within the first threshold time from the point of time of acquiring the information on the driver's lane changing intention or (ii) the second viewing event, in which the vertical distance between the central axis of the virtual viewing frustum and the specific spot corresponding to the side mirror is greater than the first threshold distance and is less than the second threshold distance, is generated less than an eighth specific number of times corresponding to the (2_2)-nd range within the first threshold time from the point of time of acquiring the information on the driver's lane changing intention, the computing device instructs the LDW system to generate the risk information on the lane change including a degree of danger within a fourth risk range, and wherein (i) the median value of the (2_1)-st range is greater than that of the (1_1)-st range, (ii) the median value of (2_2)-nd range is greater than that of the (1_2)-nd range, (iii) the median value of the (1_1)-st range is equal to or greater than that of the (1_2)-nd range, (iv) the median value of the (2_1)-st range is equal to or greater than that of the (2_2)-nd range, (v) a median value of the third risk range is equal to or greater than that of the fourth risk range, (vi) the median value of the fourth risk range is greater than that of the second risk range, and (vii) the median value of the third risk range is equal to or greater than that of the first risk range.

8. The method of claim 3, wherein, at the step of (a), the information on the road situation includes types of lanes where the driver's vehicle is located, and the computing device instructs the LDW system to determine a degree of danger when the driver changes the lane and to generate the risk information on the lane change including the degree of danger.

9. The method of claim 1, wherein, at the step of (a), the information on the driver's lane changing intention is acquired by referring to information on at least one direction indicator operated by the driver.

10. The method of claim 1, wherein, at the step of (a), the virtual viewing frustum is generated by referring to at least one image acquired by a camera attached to the side mirror.

11. A computing device for generating a lane departure warning (LDW) alarm by referring to information on a driving situation, comprising:
at least one memory that stores instructions; and
at least one processor configured to execute the instructions to perform processes of:
(I) if a destination of a driver's vehicle has been inputted to a Global Positioning System (GPS) module included therein, instructing a lane departure warning(LDW) system (i) to acquire a potential intention related to a lane change by referring to information on the destination and on a junction existing within a predetermined distance from a current location of the driver's vehicle and determines the acquired potential intention, (ii) to collect information on the driving situation including (ii-1) information on whether a specific spot corresponding to a side mirror on a side of a lane, into which the driver desires to change, belongs to a virtual viewing frustum of the driver and (ii-2) location information on at least one specific lane moving to the destination, (iii) to determine a triggering spot where the lane change is to be started to enter the specific lane by referring to the information on the driving situation, and (iv) to generate risk information on lane change, by referring to the information on the driving situation and information on the triggering spot (II) instructing the LDW system to generate the LDW alarm by referring to the risk information on the lane change.

12. The computing device of claim 11, wherein, at the process of (I), on condition that it is detected that (i) a first viewing event, in which a vertical distance between a central axis of the virtual viewing frustum and the specific spot corresponding to the side mirror is within a first threshold distance, is generated a specific number of times corresponding to a first range within a first threshold time from a point of time of acquiring the information on the driver's lane changing intention or (ii) a second viewing event, in which a vertical distance between the central axis of the virtual viewing frustum and the specific spot corresponding to the side mirror exceeds the first threshold distance and is within a second threshold distance, is generated a certain number of times corresponding to a second range within the first threshold time from the point of time of acquiring the information on the driver's lane changing intention, the processor instructs the LDW system to generate the risk information on the lane change, and wherein a median value of the second range is greater than that of the first range.

13. The computing device of claim 11, wherein, at the process of (I), the processor instructs the LDW system to collect information on the driving situation additionally including information on a road situation, and wherein, at the process of (II), the processor instructs the LDW system to adjust an intensity and a frequency of the LDW alarm by referring to the risk information on the lane change on which the information on the road situation is reflected.

14. The computing device of claim 13, wherein, at the process of (I), the information on the road situation includes information on shapes or colors of one or more lane markings located on at least one of both sides of the driver's vehicle, and wherein the processor instructs the LDW system to (i) determine at least one type of the lanes by referring to the information on the shapes or the colors of the lane markings and (ii) generate the risk information on the lane change on which information on the determined type of the lane markings is reflected.

15. The computing device of claim 14, wherein, at the process of (I), the processor instructs the LDW system to set a degree of danger, included in the risk information on the lane change when a classification of the lane markings of the lane into which the driver desires to change is a k-th level, to be higher than a degree of danger, included in the risk information on the lane change when the classification of the lane markings of the lane into which the driver desires to change is a (k+1)-th level.

16. The computing device of claim 15, wherein, at the process of (I), (1) on condition that the classification of the lane markings of the lane into which the driver desires to change is the k-th level, if it is detected that (i) a first viewing event, in which a vertical distance between a central axis of the virtual viewing frustum and the specific spot corresponding to the side mirror is within a first threshold distance, is generated a first specific number of times corresponding to a (1_1)-st range within a first threshold time from a point of time of acquiring the information on the driver's lane changing intention or (ii) a second viewing event, in which a vertical distance between the central axis of the virtual viewing frustum and the specific spot corresponding to the side mirror is greater than the first threshold distance and is less than a second threshold distance, is generated a second specific number of times corresponding to a (2_1)-st range within the first threshold time from the point of time of acquiring the information on the driver's lane changing intention, the processor instructs the LDW system to generate the risk information on the lane change including a degree of danger corresponding to a first risk range, (2) on condition that the classification of the lane markings of the lane into which the driver desires to change is the (k+1)-th level, if it is detected that (i) a first viewing event, in which a vertical distance between a central axis of the virtual viewing frustum and the specific spot corresponding to the side mirror is within a first threshold distance, is generated a third specific number of times corresponding to a (1_2)-nd range within the first threshold time from the point of time of acquiring the information on the driver's lane changing intention or (ii) a second viewing event, in which a vertical distance between the central axis of the virtual viewing frustum and the specific spot corresponding to the side mirror is greater than the first threshold distance and is less than the second threshold distance, is generated a fourth specific number of times corresponding to a (2_2)-nd range within the first threshold time from the point of time of acquiring the information on the driver's lane changing intention, the processor instructs the LDW system to generate the risk information on the lane change including a degree of danger corresponding to a second risk range, and
wherein (i) a median value of the (2_1)-st range is greater than that of the (1_1)-st range, (ii) a median value of (2_2)-nd range is greater than that of the (1_2)-nd range, (iii) the median value of the (1_1)-st range is equal to or greater than that of the (1_2)-nd range, (iv) the median value of the (2_1)-st range is equal to or greater than that of the (2_2)-nd range, and (v) a median value of the first risk range is equal to or greater than that of the second risk range.

17. The computing device of claim 16, wherein, at the process of (I), (1) on condition that the classification of the lane markings of the lane into which the driver desires to change is the k-th level, if it is detected that (i) the first viewing event, in which the vertical distance between the central axis of the virtual viewing frustum and the specific spot corresponding to the side mirror is within the first threshold distance, is generated less than a fifth specific number of times corresponding to the (1_1)-st range within the first threshold time from the point of time of acquiring the information on the driver's lane changing intention or (ii) the second viewing event, in which the vertical distance between the central axis of the virtual viewing frustum and the specific spot corresponding to the side mirror is greater than the first threshold distance and is less than the second threshold distance, is generated less than a sixth specific number of times corresponding to the (2_1)-st range within the first threshold time from the point of time of acquiring the information on the driver's lane changing intention, the processor instructs the LDW system to generate the risk information on the lane change including a degree of danger within a third risk range, (2) on condition that the classification of the lane markings of the lane into which the driver desires to change is the (k+1)-th level, if it is detected that (i) the first viewing event, in which the vertical distance between the central axis of the virtual viewing frustum and the specific spot corresponding to the side mirror is within the first threshold distance, is generated less than a seventh specific number of times corresponding to the (1_2)-nd range within the first threshold time from the point of time of acquiring the information on the driver's lane changing intention or (ii) the second viewing event, in which the vertical distance between the central axis of the virtual viewing frustum and the specific spot corresponding to the side mirror is greater than the first threshold distance and is less than the second threshold distance, is generated less than an eighth specific number of times corresponding to the (2_2)-nd range within the first threshold time from the point of time of acquiring the information on the driver's lane changing intention, the processor instructs the LDW system to generate the risk information on the lane change including a degree of danger within a fourth risk range, and
wherein (i) the median value of the (2_1)-st range is greater than that of the (1_1)-st range, (ii) the median value of (2_2)-nd range is greater than that of the (1_2)-nd range, (iii) the median value of the (1_1)-st range is equal to or greater than that of the (1_2)-nd range, (iv) the median value of the (2_1)-st range is equal to or greater than that of the (2_2)-nd range, (v) a median value of the third risk range is equal to or greater than that of the fourth risk range, (vi) the median value of the fourth risk range is greater than that of the second risk range, and (vii) the median value of the third risk range is equal to or greater than that of the first risk range.

18. The computing device of claim 13, wherein, at the process of (I), the information on the road situation includes types of lanes where the driver's vehicle is located, and the processor instructs the LDW system to determine a degree of danger when the driver changes the lane and to generate the risk information on the lane change including the degree of danger.

19. The computing device of claim 11, wherein, at the process of (I), the information on the driver's lane changing intention is acquired by referring to information on at least one direction indicator operated by the driver.

20. The computing device of claim 11, wherein, at the process of (I), the virtual viewing frustum is generated by referring to at least one image acquired by a camera attached to the side mirror.

* * * * *